United States Patent
Murota et al.

(10) Patent No.: US 10,030,203 B2
(45) Date of Patent: Jul. 24, 2018

(54) METHOD FOR HYDROCRACKING, METHOD FOR PRODUCING HYDROCRACKED OIL, HYDROCRACKING DEVICE, AND DEVICE FOR PRODUCING HYDROCRACKED OIL

(71) Applicants: Kobe Steel, Ltd., Kobe-shi (JP); CHIYODA CORPORATION, Yokohama-shi (JP)

(72) Inventors: Motoharu Murota, Takasago (JP); Toshiaki Okui, Takasago (JP); Yoichi Takahashi, Takasago (JP)

(73) Assignees: Kobe Steel, Ltd., Kobe-shi (JP); CHIYODA CORPORATION, Yokohama-shi (JP)

( * ) Notice: Subject to any disclaimer, the term of this patent is extended or adjusted under 35 U.S.C. 154(b) by 0 days.

(21) Appl. No.: 15/510,385

(22) PCT Filed: Sep. 1, 2015

(86) PCT No.: PCT/JP2015/074890
§ 371 (c)(1),
(2) Date: Mar. 10, 2017

(87) PCT Pub. No.: WO2016/056330
PCT Pub. Date: Apr. 14, 2016

(65) Prior Publication Data
US 2017/0292079 A1 Oct. 12, 2017

(30) Foreign Application Priority Data
Oct. 8, 2014 (JP) .................................. 2014-207628

(51) Int. Cl.
*C10G 47/26* (2006.01)

(52) U.S. Cl.
CPC ..... *C10G 47/26* (2013.01); *C10G 2300/4081* (2013.01); *C10G 2300/70* (2013.01)

(58) Field of Classification Search
CPC ............ C10G 47/26; C10G 2300/4081; C10G 2300/70
See application file for complete search history.

(56) References Cited

U.S. PATENT DOCUMENTS

2008/0156693 A1* 7/2008 Okui .................. C10G 7/06
208/58

FOREIGN PATENT DOCUMENTS

| JP | 62-127392 | 6/1987 |
| JP | 2001-89772 A | 4/2001 |
| JP | 2008-163097 A | 7/2008 |

OTHER PUBLICATIONS

International Preliminary Report on Patentability and Written Opinion of the International Searching Authority dated Apr. 20, 2017 in PCT/JP2015/074890 filed Sep. 1, 2015 (with English translation).

(Continued)

*Primary Examiner* — Randy Boyer
*Assistant Examiner* — Juan C Valencia
(74) *Attorney, Agent, or Firm* — Oblon, McClelland, Maier & Neustadt, L.L.P.

(57) ABSTRACT

The present invention provides a method for hydrocracking of petroleum heavy oil containing a heavy metal component, comprising a supplying step of supplying a raw material slurry containing the petroleum heavy oil and an iron-based catalyst as well as a hydrogen gas to a hydrocracking reactor; a hydrocracking step of hydrocracking the petroleum heavy oil in the hydrocracking reactor; a recovering step of recovering a residual oil component containing the iron-based catalyst from a product after the hydrocracking step; a disintegrating step of disintegrating the iron-based catalyst of the recovered residual oil component to acquire (Continued)

a disintegrated iron-based catalyst; and a resupplying step of resupplying a processed residual oil component containing the disintegrated iron-based catalyst to the hydrocracking reactor. At the disintegrating step, the iron-based catalyst may be pulverized by a pulverizing machine. The iron-based catalyst may be limonite.

14 Claims, 1 Drawing Sheet

(56) References Cited

OTHER PUBLICATIONS

International Search Report dated Oct. 6, 2015 in PCT/JP2015/074890 filed Sep. 1, 2015.

* cited by examiner

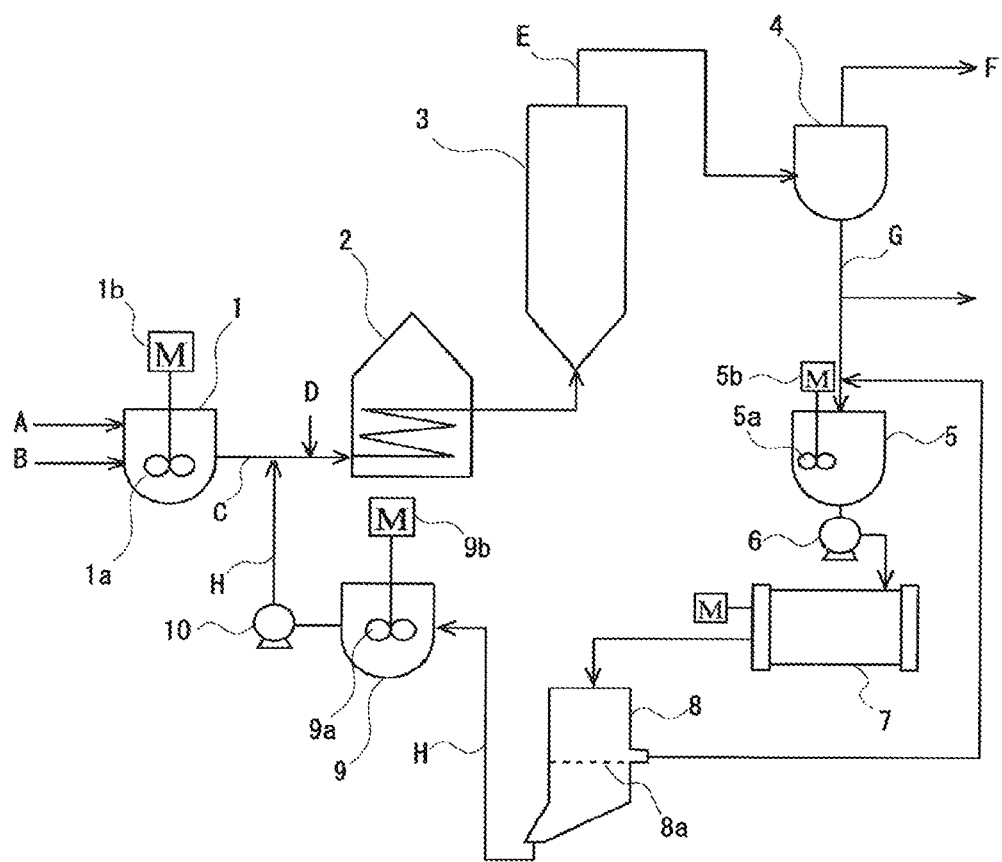

METHOD FOR HYDROCRACKING, METHOD FOR PRODUCING HYDROCRACKED OIL, HYDROCRACKING DEVICE, AND DEVICE FOR PRODUCING HYDROCRACKED OIL

TECHNICAL FIELD

The present invention relates to a method for hydrocracking, a method for producing hydrocracked oil, a hydrocracking device, and a device for producing hydrocracked oil.

BACKGROUND ART

Crude oil contains various components such as low boiling point light oil and high boiling point heavy oil. In recent years, crude oil with a high content of heavy oil (petroleum heavy oil) is increasingly supplied as crude oil. On the other hand, with regard to oil demand, the demand for light oil is still high. Therefore, a method for producing light oil from petroleum heavy oil is attracting attention.

For a method of producing light oil from petroleum heavy oil, a method of hydrocracking a raw material slurry acquired by adding an iron-based catalyst to petroleum heavy oil has been proposed (see Japanese Laid-Open Patent Publication No. 2001-89772). This conventional method for hydrocracking can efficiently remove heavy metals such as nickel and vanadium contained in the petroleum heavy oil. Additionally, this conventional method for hydrocracking is excellent in economy because a supply of a new catalyst can be suppressed by reusing the used iron-based catalyst.

However, since the catalytic activity of the reused iron-based catalyst is lower than that of the new catalyst, a supply amount of the new catalyst cannot sufficiently be reduced.

PRIOR ART DOCUMENT

Patent Document

Patent Document 1: Japanese Laid-Open Patent Publication No. 2001-89772

SUMMARY OF THE INVENTION

Problem to be Solved by the Invention

The present invention was conceived in view of such a circumstance and it is therefore an object of the present invention to provide a method for hydrocracking excellent in process cost of hydrocracking because of reusing of a catalyst increased in catalytic activity, a method for producing hydrocracked oil using this method for hydrocracking, a hydrocracking device, and a device for producing hydrocracked oil including this hydrocracking device.

Means for Solving Problem

As a result of extensive studies, the present inventors found out that the reason of reduction in catalytic activity of an iron-based catalyst is an enlargement due to aggregation of catalyst particles with each other and that the catalytic activity of the iron-based catalyst can be increased by disintegrating the enlarged iron-based catalyst to make the catalyst have an effective surface area nearly equal to that of a new catalyst, thereby completing the present invention.

Therefore, the invention conceived for solving the problem provides a method for hydrocracking of petroleum heavy oil containing a heavy metal component, comprising a supplying step of supplying a raw material slurry containing the petroleum heavy oil and an iron-based catalyst as well as a hydrogen gas to a hydrocracking reactor; a hydrocracking step of hydrocracking the petroleum heavy oil in the hydrocracking reactor; a recovering step of recovering a residual oil component containing the iron-based catalyst from a product after the hydrocracking step; a disintegrating step of disintegrating the iron-based catalyst of the recovered residual oil component to acquire a disintegrated iron-based catalyst; and a resupplying step of resupplying a processed residual oil component containing the disintegrated iron-based catalyst to the hydrocracking reactor.

Since the method for hydrocracking includes a step of disintegrating the iron-based catalyst, the iron-based catalyst used in hydrocracking is finely grained and the catalytic activity of the iron-based catalyst is increased. Therefore, the method for hydrocracking can effectively reduce the process cost of hydrocracking.

At the disintegrating step, the iron-based catalyst may be pulverized by a pulverizing machine. By pulverizing the iron-based catalyst by the pulverizing machine at the disintegrating step in this way, the iron-based catalyst can finely be grained more easily and reliably.

The iron-based catalyst may be limonite. Limonite is an inexpensive catalyst and has high catalytic activity for a hydrocracking reaction of petroleum heavy oil. Therefore, by using limonite as the iron-based catalyst, the process cost of hydrotreating can further effectively be reduced.

At the disintegrating step, the disintegrated iron-based catalyst may have an average particle size of 0.1 μm or more and 5 μm or less. By setting the average particle diameter of the disintegrated iron-based catalyst within the range described above at the disintegrating step, the process time of disintegrating the iron-based catalyst can be reduced while keeping the catalytic activity of the disintegrated iron-based catalyst high.

The disintegrating step may have a step of making the maximum particle diameter of the disintegrated iron-based catalyst equal to or less than 30 μm by screening. By making the maximum particle diameter of the disintegrated iron-based catalyst equal to or less than 30 μm by screening at the disintegrating step, the catalytic activity of the disintegrated iron-based catalyst can be increased while keeping the process time of disintegrating the iron-based catalyst short.

The content of the iron-based catalyst relative to the petroleum heavy oil in the raw material slurry is preferably 0.1% by mass or more and 3% by mass or less in terms of iron. By setting the content of the iron-based catalyst relative to the petroleum heavy oil in the raw material slurry within the range described above, the amount of a newly supplied iron-based catalyst is suppressed while maintaining the efficiency of hydrocracking, so that the process cost of hydrocracking can further be reduced.

A supply amount of the heavy reaction product contained in the processed residual oil component relative to the petroleum heavy oil in the raw material slurry is preferably 10% by mass or more and 80% by mass or less. By setting the supply amount of the heavy reaction product contained in the processed residual oil component relative to the petroleum heavy oil in the above raw material slurry within the range described above, the concentration of the petroleum heavy oil in the hydrocracking reactor is maintained while the iron-based catalyst is reused, so that the process efficiency of the petroleum heavy oil can further be increased.

A supply amount of the disintegrated iron-based catalyst relative to the petroleum heavy oil in the raw material slurry is preferably 1% by mass or more and 10% by mass or less. By setting the supply amount of the disintegrated iron-based catalyst relative to the petroleum heavy oil in the raw material slurry within the range described above, the process efficiency of the petroleum heavy oil can further be increased.

The present invention includes a method for producing hydrocracked oil from petroleum heavy oil containing a heavy metal component, wherein the method for hydrocracking is used. The method for producing hydrocracked oil is excellent in the production cost of hydrocracked oil since the method for hydrocracking is used.

Another aspect of the invention conceived for solving the problem provides a hydrocracking device for petroleum heavy oil containing a heavy metal component, comprising a hydrocracking means hydrocracking the petroleum heavy oil by using a raw material slurry containing the petroleum heavy oil and an iron-based catalyst as well as a hydrogen gas; a disintegrating means disintegrating the iron-based catalyst after hydrocracking the petroleum heavy oil by the hydrocracking means to acquire a disintegrated iron-based catalyst; and a resupplying means resupplying the disintegrated iron-based catalyst to the hydrocracking means.

Since the hydrocracking device includes the disintegrating means disintegrating the iron-based catalyst after hydrocracking the petroleum heavy oil by the hydrocracking means and the resupplying means resupplying the disintegrated iron-based catalyst to the hydrocracking means, the iron-based catalyst used in hydrocracking is finely grained and the catalytic activity of the iron-based catalyst is increased. Therefore, by using the hydrocracking device, the process cost of hydrocracking can effectively be reduced.

The disintegrating means may be a pulverizing machine. By using a pulverizing machine as the disintegrating means in this way, the iron-based catalyst can finely be grained more easily and reliably.

The hydrocracking device may further comprise a screening means screening the disintegrated iron-based catalyst before resupply to the hydrocracking means to make the maximum particle diameter thereof equal to or less than 30 μm. Since the hydrocracking device further comprises the screening means and the screening is performed to make the maximum particle diameter of the disintegrated iron-based catalyst equal to or less than 30 μm, the catalytic activity of the disintegrated iron-based catalyst can be increased while keeping the process time of disintegrating the iron-based catalyst short.

The present invention includes a device for producing hydrocracked oil comprising the hydrocracking device. The device for producing hydrocracked oil comprises the hydrocracking device and therefore has a low production cost of hydrocracked oil.

Effect of the Invention

As described above, the method of hydrocracking and the hydrocracking device of the present invention are excellent in the process cost of hydrocracking because the catalyst increased in catalytic activity is reused. Therefore, the method for producing hydrocracked oil using this method for hydrocracking and the device for producing hydrocracked oil including the hydrocracking device are excellent in the production cost of hydrocracked oil.

BRIEF DESCRIPTION OF DRAWINGS

FIG. 1 is a schematic diagram of a configuration of a device for producing hydrocracked oil.

MODES FOR CARRYING OUT THE INVENTION

An embodiment of a method for producing hydrocracked oil using a method for hydrocracking according to the present invention will be described with reference to a device for producing hydrocracked oil including a hydrocracking device according to the present invention of FIG. 1.

<Device for Producing Hydrocracked Oil>

The device for producing hydrocracked oil shown in FIG. 1 includes a slurry preparation tank 1, a preheater 2, a hydrocracking reactor 3, a gas-liquid separator 4, a first intermediate tank 5, a first pump 6, a pulverizing machine 7, a sieving machine 8, a second intermediate tank 9, and a second pump 10. Among these, the hydrocracking reactor 3, the pulverizing machine 7, the sieving machine 8, and the second pump 10 constitute the hydrocracking device.

The slurry preparation tank 1 is a tank for mixing a petroleum heavy oil A and an iron-based catalyst B to prepare a raw material slurry C. The slurry preparation tank 1 includes a stirring machine 1a and a motor 1b driving the stirring machine 1a.

The preheater 2 is a heater for preheating the raw material slurry C and the hydrogen gas D supplied to the hydrocracking reactor 3.

The hydrocracking reactor 3 is a hydrocracking means of the hydrocracking device and hydrocracks the petroleum heavy oil A therein by using the raw material slurry C containing the petroleum heavy oil A and the iron-based catalyst B as well as the hydrogen gas D. This hydrocracking reactor 3 can be, for example, a bubble tower type slurry-bed reactor.

The gas-liquid separator 4 is a separator separating a product E of the hydrocracking reactor 3 into a gas-phase component F mainly containing a light reaction product, a medium reaction product that is gaseous at the gas-liquid separation temperature, and an unreacted hydrogen gas D, and a residual oil component G containing a medium reaction product that is liquid at the gas-liquid separation temperature, a heavy reaction product, a heavy metal component, and the iron-based catalyst B. The gas-liquid separator 4 can be a known gas-liquid separator.

In the present invention, the "light reaction product" refers to a component having a boiling point of 36° C. or more and less than 171° C. among products after a hydrocracking step; the "medium reaction product" refers to a component having a boiling point of 171° C. or more and less than 525° C. among the products after the hydrocracking step; and the "heavy reaction product" refers to a component having a boiling point of 525° C. or more among the products after the hydrocracking step. The "products after the hydrocracking step" is a concept including an unreacted petroleum heavy oil component in hydrocracking.

In the present invention, "being gaseous at the gas-liquid separation temperature" means being a gas under the temperature and pressure conditions in the gas-liquid separator 4, and "being liquid at the gas-liquid separation temperature" means being a liquid under the temperature and pressure conditions in the gas-liquid separator 4.

In the present invention, "particle diameter" refers to a volume-based particle diameter measured by a laser diffraction type particle size distribution measuring instrument, and "average particle diameter" means a 50% value (median value) of the cumulative particle size distribution curve of the particle diameter.

In the present invention, "disintegration" means separating aggregated catalyst particles. Although breaking (pulverization) of catalyst particles before aggregation may occur depending on a method of disintegration, "disintegration" is a concept including this pulverization.

The first intermediate tank 5 is a tank storing the residual oil component G. The first intermediate tank 5 includes a stirring machine 5a and a motor 5b driving the stirring machine 5a.

The first pump 6 is a pump for supplying the residual oil component G stored in the first intermediate tank 5 to the pulverizing machine 7. The type of the first pump 6 is not particularly limited and can be, for example, a known diaphragm, piston, plunger, or centrifugal pump.

The pulverizing machine 7 is a disintegrating means of the hydrocracking device and pulverizes the iron-based catalyst B contained in the residual oil component G. The type of the pulverizing machine 7 is not particularly limited and examples thereof can include a ball mill, a tower mill, etc. Among these, a ball mill can preferably be used because of being easily increased in size and facilitating an improvement in the productivity of the hydrocracked oil.

The sieving machine 8 is a screening means of the hydrocracking device and is a sieving machine screening and excluding large diameter particles of the disintegrated iron-based catalyst pulverized by the pulverizing machine 7. The sieving machine 8 has a mesh 8a for excluding large diameter particles of the disintegrated iron-based catalyst.

The second intermediate tank 9 is a tank storing a processed residual oil component H containing the disintegrated iron-based catalyst. The second intermediate tank 9 includes a stirring machine 9a and a motor 9b driving the stirring machine 9a.

The second pump 10 is a resupplying means of the hydrocracking device and resupplies the disintegrated iron-based catalyst to the hydrocracking means. Specifically, the second pump 10 supplies the processed residual oil component H stored in the second intermediate tank 9 to the hydrocracking reactor 3 through the preheater 2. The second pump 10 is not particularly limited and can be the same pump as the first pump 6.

<Method for Hydrocracking>

The method for hydrocracking is a method for hydrocracking the petroleum heavy oil A containing a heavy metal component. The method for hydrocracking includes a supplying step of supplying the raw material slurry C containing the petroleum heavy oil A and the iron-based catalyst B as well as the hydrogen gas D to the hydrocracking reactor 3, the hydrocracking step of hydrocracking the petroleum heavy oil A in the hydrocracking reactor 3 into the product E containing a medium reaction product and a heavy reaction product, a recovering step of recovering the residual oil component G containing the medium reaction product, the heavy reaction product, the heavy metal component, and the iron-based catalyst B from the product E after the hydrocracking step, a disintegrating step of disintegrating the iron-based catalyst B of the recovered residual oil component G to acquire a disintegrated iron-based catalyst, and a resupplying step of resupplying the processed residual oil component H containing the disintegrated iron-based catalyst to the hydrocracking reactor.

(Supplying Step)

In supplying step, the raw material slurry C containing the petroleum heavy oil A and the iron-based catalyst B as well as the hydrogen gas D are supplied to the hydrocracking reactor 3 as described above. Specifically, the petroleum heavy oil A, the iron-based catalyst B, and sulfur serving as a promoter are supplied to the slurry preparation tank 1. The petroleum heavy oil A, the iron-based catalyst B, and the promoter are mixed by the stirring machine 1a driven by the motor 1b to acquire the raw material slurry C containing the petroleum heavy oil A, the iron-based catalyst B, and the promoter. This raw material slurry C and the hydrogen gas D are mixed in a piping and supplied through the preheater 2 to the hydrocracking reactor 3.

The petroleum heavy oil A is not particularly limited and can be petroleum heavy oil such as atmospheric distillation residue oil and vacuum distillation residue oil. Additionally, the petroleum heavy oil A can be extra heavy oil such as naturally occurring bitumen (tar sand, oil sand, etc.).

The iron-based catalyst B is not particularly limited as long as the catalyst is highly active as a catalyst for the hydrocracking reaction of the petroleum heavy oil A, and examples thereof can include limonite, pyrite, hematite, red mud, etc. Among these, limonite is preferable. In addition to being inexpensive and having high catalytic activity, limonite is soft as compared to pyrite and hematite and can easily be disintegrated as described later. Limonite contains α-iron oxyhydroxide and α-iron oxide, and limonite containing 90% or more α-oxyhydroxide is more preferably.

If the iron-based catalyst B is a compound containing sulfur such as pyrite, sulfur may not be mixed as a promoter.

The reason of the high catalytic activity of limonite will be described. The iron-based catalyst B is sulfurized by sulfur mixed as a promoter or coexisting as a component contained in the iron-based catalyst B and is turned into an iron sulfide called pyrrohotite ($Fe_{(1-x)}S$) so that the catalytic activity is increased. When the temperature of conversion into pyrrohotite is lower, more pyrrohotite exits at the start of pyrolysis of the petroleum heavy oil A, and the conversion of the petroleum heavy oil A into light oil favorably progresses. Therefore, it can be said that the catalytic activity is higher when the temperature of conversion into pyrrohotite is lower.

The temperatures of conversion of α-iron oxyhydroxide and α-iron oxide contained in limonite into pyrrohotite are approximately 200° C. and approximately 350° C., respectively. The temperature of conversion of pyrite into pyrrohotite is approximately 350° C. Because of containing α-iron oxyhydroxide as described above, limonite easily converts into pyrrohotite at low temperature and therefore has high catalytic activity.

The lower limit of the average particle diameter of the iron-based catalyst B is preferably 0.1 μm, more preferably 0.3 μm. The upper limit of the average particle diameter of the iron-based catalyst B is preferably 2 μm, more preferably 1 μm. If the average particle diameter of the iron-based catalyst B is less than the lower limit, it takes time for mechanical pulverization to achieve the iron-based catalyst B with such a small average particle diameter, and the process efficiency of hydrocracking may decrease. On the other hand, if the average particle diameter of the iron-based catalyst B exceeds the upper limit, the effective surface area of the iron-based catalyst B may be insufficient, resulting in a reduction in catalytic activity.

The lower limit of the content of the iron-based catalyst B relative to the petroleum heavy oil A in the raw material slurry C is preferably 0.1% by mass, and more preferably 0.2% by mass in terms of iron. The upper limit of the supply amount of the iron-based catalyst B is preferably 3% by mass, more preferably 1% by mass in terms of iron. If the supply amount of the iron-based catalyst B is less than the lower limit, the hydrocracking reaction does not proceed and the light oil may not sufficiently be acquired. On the other hand, if the supply amount of the iron-based catalyst B exceeds the upper limit, the process cost of hydrocracking may increase.

The lower limit of the amount of the promoter relative to the iron-based catalyst B is preferably 1, more preferably 1.1, in terms of the ratio of the mole number of sulfur atoms to the mole number of iron atoms of the iron-based catalyst B. The upper limit of the amount of the promoter relative to the iron-based catalyst B is preferably 3, more preferably 2, in terms of the ratio of the mole number of sulfur atoms to the mole number of iron atoms of the iron-based catalyst B. If the amount of the promoter relative to the iron-based catalyst B is less than the lower limit, the catalytic activity of the iron-based catalyst B may not sufficiently be increased. On the other hand, if the amount of the promoter relative to the iron-based catalyst B exceeds the upper limit, the process cost of hydrocracking may increase.

Since the pressure of the hydrocracking reactor 3 becomes substantially equal to the supply pressure of the hydrogen gas D, the supply pressure of the hydrogen gas D supplied to the hydrocracking reactor 3 may be a pressure suitable for the reaction pressure of hydrocracking described later and can be, for example, a pressure higher than the reaction pressure of hydrocracking by 0.5 MPa or more and 3 MPa or less in consideration of the flow rate of the hydrogen gas D etc.

The temperature of heating of the raw material slurry C and the hydrogen gas D in the preheater 2 may be near the temperature at which the hydrocracking reaction starts.

(Hydrocracking Step)

At the hydrocracking step, the petroleum heavy oil A of the raw material slurry C is hydrocracked by the hydrogen gas D in the hydrocracking reactor 3. As a result of this hydrocracking, the product E containing the medium reaction product and the heavy reaction product is acquired.

The lower limit of the reaction pressure of hydrocracking (hydrogen gas supply pressure) is preferably 5 MPa, more preferably 7 MPa. The upper limit of the reaction pressure of hydrocracking is preferably 20 MPa, more preferably 15 MPa. If the reaction pressure of hydrocracking is less than the lower limit, a hydrogen partial pressure becomes small and a coke formation amount increases, so that the catalytic activity of the iron-based catalyst B may decrease. On the other hand, if the reaction pressure of hydrocracking exceeds the upper limit, a reaction promoting effect due to a pressure increase is not acquired and the process cost of hydrocracking may increase. It is noted that the reaction pressure can be adjusted by an amount of the hydrogen gas D supplied at the supplying step.

The lower limit of the hydrogenation reaction temperature is preferably 400° C., more preferably 430° C. The upper limit of the hydrogenation reaction temperature is preferably 480° C., more preferably 455° C. If the hydrogenation reaction temperature is less than the lower limit, the hydrocracking reaction does not proceed and the light oil may not sufficiently be acquired. On the other hand, if the hydrogenation reaction temperature exceeds the upper limit, a coke formation amount increases due to a thermal decomposition reaction, so that the catalytic activity of the iron-based catalyst B may decrease.

The lower limit of the hydrogenation reaction time is preferably 30 minutes, more preferably 60 minutes. The upper limit of the hydrogenation reaction time is preferably 180 minutes, more preferably 120 minutes. If the hydrogenation reaction time is less than the lower limit, the light oil may not sufficiently be acquired. On the other hand, if the hydrogenation reaction time exceeds the upper limit, an increase in amount of the acquired light oil becomes small with respect to an increase in time, and the production efficiency of the hydrocracked oil may deteriorate.

The lower limit of the concentration of hydrogen sulfide generated by the reaction of hydrogen and sulfur in the hydrocracking reactor 3 is preferably 4000 ppm, more preferably 5000 ppm. If the concentration of the hydrogen sulfide is less than the lower limit, pyrrhotite ($Fe_{(1-x)}S$) generated by sulfurization of the iron-based catalyst B is easily transformed into troilite (FeS), and the catalytic activity may decrease.

(Recovering Step)

At the recovering step, the residual oil component G containing the medium reaction product, the heavy reaction product, the heavy metal component, and the iron-based catalyst B is recovered from the product E after the hydrocracking step. Specifically, the product E after the hydrocracking step is separated into the gas-phase component F and the residual oil component G by the gas-liquid separator 4.

This gas-liquid separation is performed at a temperature reduced by 20° C. or more and 80° C. or less by natural cooling from the reaction temperature at the hydrocracking step. Therefore, the gas-phase component F mainly contains the light reaction product, the medium reaction product that is gaseous at the gas-liquid separation temperature, and the unreacted hydrogen gas D. The temperature of gas-liquid separation may be adjusted by heating or cooling. From this gas-phase component F, hydrocracked oil can be acquired by a production method described later.

The residual oil component G mainly contains the medium reaction product that is liquid at the gas-liquid separation temperature, the heavy reaction product, the used iron-based catalyst B, and a component derived from heavy metal. A portion or entire of this residual oil component G is recovered into the first intermediate tank 5. To prevent sedimentation of solid components such as the heavy metal component and the iron-based catalyst B contained in the residual oil component G, the recovered residual oil component G may be stirred by using the stirring machine 5a driven by the motor 5b while being stored in the first intermediate tank 5. The residual oil component G not recovered into the first intermediate tank 5 is drawn out of the system of the device for producing hydrocracked oil.

The lower limit of the content of the heavy reaction product contained in the residual oil component G is preferably 10% by mass, more preferably 20% by mass. The upper limit of the content of the heavy reaction product contained in the residual oil component G is preferably 80% by mass, more preferably 60% by mass. If the content of the heavy reaction product contained in the residual oil component G is less than the lower limit, non-reused components relatively increase and the volumetric efficiency of the hydrocracking reactor 3 may decrease. On the other hand, if the content of the heavy reaction product contained in the residual oil component G exceeds the upper limit, the raw material slurry C may decrease in fluidity and become difficult to handle when the processed residual oil component H is mixed with the raw material slurry C. The heavy reaction product contained in the residual oil component G can be controlled by adjusting the reaction conditions (reaction pressure, temperature, and reaction time) at the hydrocracking step and the temperature condition of gas-liquid separation at the recovering step, for example.

(Disintegrating Step)

At the disintegrating step, a disintegrated iron-based catalyst is acquired by pulverizing the iron-based catalyst B in the recovered residual oil component G. Specifically, the residual oil component G recovered into the first intermediate tank 5 is supplied to the pulverizing machine 7 by using the first pump 6, and the iron-based catalyst B in the residual oil component G is pulverized by the pulverizing machine 7.

An effect of pulverizing the iron-based catalyst B in the residual oil component G will be discussed. The residual oil component G discharged from the hydrocracking reactor 3 contains the iron-based catalyst B and a coke-like substance generated during the reaction. Many of these solids are granular coarse particles produced by aggregation and granulation of the iron-based catalyst B originally formed of fine powder. The iron-based catalyst B has the catalytic activity increased when the particle diameter becomes smaller. A catalytic reaction mainly occurs on particle surfaces of the iron-based catalyst B. Therefore, it is considered that the catalytic activity becomes higher because the effective surface area increases when the particle diameter of the iron-based catalyst B is made smaller. From the above, the catalytic activity can be increased by finely graining the granular coarse particles of the iron-based catalyst B to a level of the original particle diameter.

Since the iron-based catalyst B is transformed into pyrrohotite prone to degradation due to oxidation in the hydrocracking reactor 3, the iron-based catalyst B is preferably finely grained in a wet manner. Additionally, by performing this wet disintegration in the residual oil component G, the need to separate and recover the iron-based catalyst B is eliminated, so that the wet disintegration is further reduced in the process time and the process cost.

The lower limit of the average particle diameter of the disintegrated iron-based catalyst after disintegration is preferably 0.1 µm), more preferably 0.3 µm. The upper limit of the average particle diameter of the disintegrated iron-based catalyst is preferably 5 µm, more preferably 2 µm. If the average particle diameter of the disintegrated iron-based catalyst is less than the lower limit, it takes time to disintegrate the iron-based catalyst B, and the process cost of hydrocracking may increase. On the other hand, if the average particle diameter of the disintegrated iron-based catalyst exceeds the upper limit, the catalytic activity of the disintegrated iron-based catalyst may not sufficiently be increased.

After the disintegration, the maximum particle diameter of the disintegrated iron-based catalyst is made equal to or less than a certain value by screening. Although the method of screening is not particularly limited, the screening can be performed with the mesh 8a by using the sieving machine 8 as shown in FIG. 1, for example. The upper limit of the screened particle diameter (the mesh diameter of the mesh 8a) is preferably 30 µm, more preferably 15 µm. If the screened particle diameter exceeds the upper limit, the catalytic activity of the disintegrated iron-based catalyst may not sufficiently be increased. The disintegrated iron-based catalyst having a particle diameter larger than the diameter of the mesh 8a and unable to pass through the mesh 8a may be supplied to and pulverized by the pulverizing machine 7 again.

The processed residual oil component H containing the disintegrated iron-based catalyst disintegrated and screened in this way is recovered into the second intermediate tank 9. To prevent sedimentation of solid components such as heavy metal component and the iron-based catalyst B contained in the processed residual oil component H, the recovered processed residual oil component H may be stirred by using the stirring machine 9a driven by the motor 9b while being stored in the second intermediate tank 9.

(Resupplying Step)

At the resupplying step, the processed residual oil component H containing the disintegrated iron-based catalyst is resupplied to the hydrocracking reactor 3. Specifically, the processed residual oil component H containing the disintegrated iron-based catalyst recovered in the second intermediate tank 9 is mixed with the raw material slurry C in the piping by using the second pump 10 and resupplied though the preheater 2 to the hydrocracking reactor 3.

The lower limit of the supply amount of the heavy reaction product contained in the processed residual oil component H relative to the petroleum heavy oil A in the raw material slurry C is preferably 10% by mass, more preferably 20% by mass. The upper limit of the total supply amount is preferably 80% by mass, more preferably 60% by mass. If the total supply amount is less than the lower limit, the amount of the processed residual oil component H hydrocracked and converted into light oil may become small, resulting in a reduction in the yield of the hydrocracked oil. On the other hand, if the total supply amount exceeds the upper limit, the raw material slurry C may decrease in fluidity and become difficult to handle when the processed residual oil component 11 is mixed with the raw material slurry C.

The lower limit of the supply amount of the disintegrated iron-based catalyst relative to the petroleum heavy oil A in the raw material slurry C is preferably 1% by mass, more preferably 3% by mass. The upper limit of the supply amount of the disintegrated iron-based catalyst is preferably 10% by mass, more preferably 5% by mass. If the supply amount of the disintegrated iron-based catalyst is less than the lower limit, the supply amount of the reused disintegrated iron-based catalyst may become insufficient. On the other hand, if the supply amount of the disintegrated iron-based catalyst exceeds the upper limit, the reused disintegrated iron-based catalyst increases and the processing efficiency of hydrocracking may deteriorate.

In a steady state, a lower limit of an iron-based catalyst amount (a sum of the newly supplied iron-based catalyst B and the reused disintegrated iron-based catalyst) in the hydrocracking reactor 3 relative to the petroleum heavy oil A in the raw material slurry C is preferably 2% by mass, more preferably 3% by mass. An upper limit of the iron-based catalyst amount in the hydrocracking reactor 3 is preferably 11% by mass, more preferably 6% by mass. If the iron-based catalyst amount in the hydrocracking reactor 3 is less than the lower limit, the supply amount of the iron-based catalyst may be insufficient, resulting in a reduction in the yield of the hydrocracked oil. On the other hand, if the iron-based catalyst amount in the hydrocracking reactor 3 exceeds the upper limit, the supply amount of the newly supplied iron-based catalyst B or the reused disintegrated iron-based catalyst must be increased and the process cost of hydrocracking may increase. The "steady state" refers to a state in which the total amount of the iron-based catalyst in the hydrocracking reactor 3 has passed through a transient state at the start of the apparatus etc. and, for example, a rate of variation in the total amount of the iron-based catalyst in the hydrocracking reactor 3 per unit time is within 10% by mass although a slight increase or decrease may occur over time.

<Method for Producing Hydrocracked Oil>

The method for producing hydrocracked oil will be explained. The method for producing hydrocracked oil uses the method for hydrocracking. Specifically, the gas-phase component F acquired at the recovering step is cooled and separated into a gas component and a liquid component so as to produce hydrocracked oil. The separated liquid component is hydrocracked oil in which a light reaction product and a medium reaction product are mixed. The liquid component may be separated as needed by distillation into the light reaction product and the medium reaction product.

The method for producing hydrocracked oil may include other steps. Such steps include, for example, a step of hydrotreating of the liquid component contained in the gas-phase component F by using a Ni—Mo based catalyst or a Co—Mo based catalyst and a gas-liquid separation step performed after this hydrotreating step. The hydrotreating step and the gas-liquid separation step may repeatedly be performed.

Hydrocracked oil can be acquired from the residual oil component G drawn out of the system of the device for producing hydrocracked oil at the recovering step. Specifically, the residual oil component G can be separated into a medium reaction product and the other components such as a heavy reaction product, a catalyst, and heavy metal by a method such as distillation, so as to recover the medium reaction product as the hydrocracked oil.

<Advantages>

Since the method for hydrocracking includes a step of disintegrating the iron-based catalyst B, the iron-based catalyst B used in hydrocracking is finely grained and the catalytic activity of the iron-based catalyst B is increased. Therefore, the method for hydrocracking can effectively reduce the process cost of hydrocracking. The method for producing hydrocracked oil is excellent in the production cost of hydrocracked oil since the method for hydrocracking is used.

Other Embodiments

The method for hydrocracking, the method for producing hydrocracked oil, the hydrocracking device, and the device for producing hydrocracked oil are not limited to the embodiments described above.

In the embodiments, the petroleum heavy oil and the iron-based catalyst are prepared in the slurry preparation tank and then supplied through the preheater to the hydrocracking reactor; however, the petroleum heavy oil and the iron-based catalyst may be mixed in a piping (in-line mixing) without using the slurry preparation tank and supplied to the hydrocracking reactor.

In the embodiments, the residual oil component acquired from the gas-liquid separator is recovered into the first intermediate tank in the case described above; however, before recovering into the first intermediate tank, vacuum flash separation may be performed by using a flash separator so as to separate a medium oil component in the residual oil component to the gas phase side. The medium oil component separated to the gas phase side is added to the gas-phase component separated by the gas-liquid separator and is recovered as hydrocracked oil.

In the embodiments, the iron-based catalyst is pulverized by using the pulverizing machine in the described method; however, the iron-based catalyst may be disintegrated by a dispersing machine. Examples of such a dispersing machine can include an ultrasonic dispersing machine. The iron-based catalyst used as the catalyst is formed as aggregations of small-diameter particles of the iron-based catalyst and therefore may be disintegrated by ultrasonic wave. If an ultrasonic dispersing machine is used, for example, an available method may be to attach a known ultrasonic disintegrating machine to a piping on the downstream side of the first intermediate tank.

In the embodiments, after the iron-based catalyst is pulverized by using the pulverizing machine, the maximum particle diameter of the disintegrated iron-based catalyst is made equal to or less than a certain value by screening in the described method; however, this screening is not an essential constituent requirement. A certain effect of increasing the catalytic activity can be acquired from the disintegrated iron-based catalyst without screening.

In the embodiment, the processed residual oil component is mixed with the raw material slurry in the piping in the described case; however, the processed residual oil component may be supplied to the slurry preparation tank and mixed with the raw material slurry.

EXAMPLES

The present invention will hereinafter more specifically be described with reference to examples; however, the present invention is not limited thereto.

Reference Example 1

To 500 g of vacuum distillation residue oil serving as petroleum heavy oil, limonite was added as an iron-based catalyst in an amount of 0.3% by mass in terms of iron relative to the petroleum heavy oil, and sulfur was added as a promoter in an amount of 1.2 in terms of the ratio of the mole number of sulfur atoms to the mole number of iron atoms of limonite so as to prepare a raw material slurry.

The composition of this limonite is shown in Table 1. The limonite was pulverized to an average particle diameter of 1 μm or less before use. The pulverization was performed by using "Planetary Mill Pulverisette 5" from FRITSCH (hereinafter also referred to as a "planetary mill"). Specifically, 20 g of dried limonite, 80 g of gas oil, and 50 crushing balls (10 mm in diameter) made of SUS 316 were put into a pot (250 ml capacity) of the planetary mill. While this planetary mill was operated at 250 rpm, the particle diameter was measured every hour and the pulverization was continued until the 50% average particle diameter (median value) became equal to or less than 1 μm. The particle size was measured by using "SALD 2000" from Shimadzu Corporation.

The raw material slurry was put into a gas flow type autoclave having an inner volume of 5 L and a hydrogen gas was supplied to the autoclave and increased in pressure and temperature to the hydrogen gas reaction pressure of 5 MP and the temperature of 450° C. After reaching the predetermined pressure and the predetermined temperature, a hydrocracking reaction was performed for 1 hour. The completion of the hydrocracking reaction was followed by cooling and depressurization to acquire a hydrocracked product.

Example 1

The hydrocracked product acquired in Reference Example 1 was extracted and filtrated by using a large amount (20 times or more by mass) of tetrahydrofuran (THF), and THF was distilled away from the filtration residue to recover THF insoluble component (hereinafter also referred to as a THFI component) containing used iron-base catalyst. The composition of this THFI component is shown in Table 1. After mixing with 80 g of gas oil, 20 g of this THFI component was disintegrated in an ultrasonic disintegrating machine ("BRANSONIC ULTRASONIC CREANER 2510 J-MT" from Emerson Japan, Ltd.).

TABLE 1

|  |  | Fe | Si | Al | Ca | Mg | S |
|---|---|---|---|---|---|---|---|
| limonite | mass % | 56.65 | 1.91 | 1.06 | 0.05 | 0.09 | 0.03 |
| THFI component | mass % | 58.36 | — | — | 0.06 | 0.06 | 40.47 |

To 500 g of vacuum distillation residue oil serving as petroleum heavy oil, the THFI component disintegrated by the ultrasonic disintegrating machine was added as an iron-based catalyst in an amount of 0.3% by mass in terms of iron relative to the petroleum heavy oil, and sulfur was added as a promoter in an amount of 1.2 in terms of the ratio of the mole number of sulfur atoms to the mole number of iron atoms of the disintegrated iron-based catalyst so as to prepare a second raw material slurry.

The second raw material slurry was put into a gas flow type autoclave having an inner volume of 5 L and a hydrogen gas was supplied to the autoclave and increased in pressure and temperature to the hydrogen gas reaction pressure of 5 MP and the temperature of 450° C. After reaching the predetermined pressure and the predetermined temperature, a hydrocracking reaction was performed for 1 hour, and the completion of the hydrocracking reaction was followed by cooling and depressurization to acquire a hydrocracked product.

Comparison Example 1

The hydrocracking was performed as is the case with Example 1 except that the THFI component was directly used without disintegrating the THFI component of Example 1 by the ultrasonic disintegrating machine, and a hydrocracked product was acquired again.

<Evaluation>

The hydrocracking of Reference Example 1 and the second hydrocracking of Example 1 and Comparison Example 1 were evaluated in terms of the average particle size of the iron-based catalyst used and the component analysis of the products acquired by the hydrocracking in accordance with the following method. The results are shown in Table 2.

(Average Particle Diameter)

The 50% average particle diameter (median value) of the iron-based catalyst used was measured by using "SALD 2000" from Shimadzu Corporation.

(Component Analysis)

A gaseous product was analyzed by gas chromatography, and a liquid or solid product was analyzed by distillation fractionation or solvent fractionation. From the analysis results, an oil yield was calculated as a proportion of a component with a boiling point lower than 525° C. (the light reaction product and the medium reaction product) to the petroleum heavy oil, and a bottom yield was calculated as a proportion of a component with a boiling point of 525° C. or higher (the heavy reaction product) to the petroleum heavy oil.

TABLE 2

|  |  |  |  | Reference example 1 | Embodiment 1 | Comparison example 1 |
|---|---|---|---|---|---|---|
| 50% average particle diameter of iron-based catalyst |  |  | μm | 0.96 | 1.1 | 168 |
| oil yield |  |  | mass % | 72.9 | 72.2 | 66.7 |
| bottom yield |  |  | mass % | 24.2 | 25.1 | 28.7 |
| components | hydrocarbon gas |  | mass % | 4.2 | 4.5 | 5.4 |
|  | light reaction product |  | mass % | 10.3 | 9.8 | 8.8 |
|  | medium reaction product | boiling point: 171 to 343 degrees C. | mass % | 27.8 | 27.2 | 24.5 |
|  |  | boiling point: 343 to 525 degrees C. | mass % | 34.8 | 35.2 | 33.5 |
|  | heavy reaction product | HS component | mass % | 5.9 | 6.0 | 4.5 |
|  |  | HI-TS component | mass % | 10.0 | 10.2 | 12.8 |
|  |  | coke | mass % | 8.3 | 8.9 | 11.5 |

In Table 2, "HS component (Hexane soluble component)" of the heavy reaction product refers to a component soluble in hexane in the heavy reaction product. "HI-TS component (Hexane insoluble-Toluene soluble component)" refers to a component insoluble in hexane and soluble in toluene in the heavy reaction product. "Coke" refers to a component insoluble in toluene in the heavy reaction product.

From Table 2, the following can be seen.

In Example 1 reusing the disintegrated iron-based catalyst contained in the disintegrated THFI component, the 50% average particle diameter of the iron-based catalyst is on the same level as the 50% average particle diameter of the iron-based catalyst of Reference Example 1 using only the new catalyst, and the oil yield is substantially the same.

On the other hand, in Comparative Example 1 using the iron-based catalyst contained in the THFI component without disintegrating the THFI component, the 50% average particle diameter of the iron-based catalyst is larger than the 50% average particle diameter of the iron-based catalysts of Example 1 and Reference Example 1, and the oil yield is low.

As described above, by finely graining the catalyst of Example 1 to the level of the original particle diameter (particle diameter of Reference Example 1), the catalytic activity is increased.

Therefore, it was found that the method for hydrocracking is excellent in the production cost of hydrocracked oil.

INDUSTRIAL APPLICABILITY

As described above, the method of hydrocracking and the hydrocracking device of the present invention are excellent in the process cost of hydrocracking because the catalyst increased in catalytic activity is reused. Therefore, the method for producing hydrocracked oil using this method for hydrocracking and the device for producing hydrocracked oil including the hydrocracking device are excellent in the production cost of hydrocracked oil.

EXPLANATIONS OF LETTERS OR NUMERALS 1 slurry preparation tank
1a, 5a, 9a stirring machine
1b, 5b, 9b motor
2 preheater
3 hydrocracking reactor
4 gas-liquid separator
5 first intermediate tank
6 first pump
7 pulverizing machine
8 sieving machine
8a mesh
9 second intermediate tank
10 second pump
A petroleum heavy oil
B iron-based catalyst
C raw material slurry
D hydrogen gas
E product
F gas-phase component
G residual oil component
H processed residual oil component

The invention claimed is:

1. A method for hydrocracking of petroleum heavy oil containing a heavy metal component, the method comprising:
   supplying a raw material slurry comprising the petroleum heavy oil and an iron-based catalyst, and a hydrogen gas to a hydrocracking reactor;
   hydrocracking the petroleum heavy oil in the hydrocracking reactor;
   recovering a residual oil component comprising the iron-based catalyst from a product after the hydrocracking;
   disintegrating the iron-based catalyst of the recovered residual oil component to acquire a disintegrated iron-based catalyst; and
   resupplying a processed residual oil component comprising the disintegrated iron-based catalyst to the hydrocracking reactor,
   wherein the disintegrating comprises pulverizing the iron-based catalyst by a pulverizing machine.

2. The method for hydrocracking according to claim 1, wherein the iron-based catalyst is limonite.

3. A method for hydrocracking of petroleum heavy oil containing a heavy metal component, the method comprising:
   supplying a raw material slurry comprising the petroleum heavy oil and an iron-based catalyst and a hydrogen gas to a hydrocracking reactor;
   hydrocracking the petroleum heavy oil in the hydrocracking reactor;
   recovering a residual oil component comprising the iron-based catalyst from a product after the hydrocracking;
   disintegrating the iron-based catalyst of the recovered residual oil component to acquire a disintegrated iron-based catalyst; and
   resupplying a processed residual oil component comprising the disintegrated iron-based catalyst to the hydrocracking reactor,
   wherein the disintegrating produces a disintegrated iron-based catalyst that has an average particle size of from 0.1 μm to 5 μm.

4. A method for hydrocracking of petroleum heavy oil containing a heavy metal component, the method comprising:
   supplying a raw material slurry comprising the petroleum heavy oil and an iron-based catalyst, and a hydrogen gas to a hydrocracking reactor;
   hydrocracking the petroleum heavy oil in the hydrocracking reactor;
   recovering a residual oil component comprising the iron-based catalyst from a product after the hydrocracking;
   disintegrating the iron-based catalyst of the recovered residual oil component to acquire a disintegrated iron-based catalyst; and
   resupplying a processed residual oil component comprising the disintegrated iron-based catalyst to the hydrocracking reactor,
   wherein the disintegrating comprises screening the disintegrated iron-based catalyst to provide a catalyst having a maximum particle diameter equal to or less than 30 μm.

5. The method for hydrocracking according to claim 1, wherein a content of the iron-based catalyst relative to the petroleum heavy oil in the raw material slurry is from 0.1% by mass to 3% by mass in terms of iron.

6. The method for hydrocracking according to claim 1, wherein a supply amount of the heavy reaction product contained in the processed residual oil component relative to the petroleum heavy oil in the raw material slurry is from 10% by mass to 80% by mass.

7. The method for hydrocracking according to claim 1, wherein a supply amount of the disintegrated iron-based catalyst relative to the petroleum heavy oil in the raw material slurry is from 1% by mass to 10% by mass.

8. A hydrocracking device for petroleum heavy oil containing a heavy metal component, comprising:
   a hydrocracking means hydrocracking the petroleum heavy oil by using a raw material slurry containing the petroleum heavy oil and an iron-based catalyst as well as a hydrogen gas;
   a disintegrating means disintegrating the iron-based catalyst after hydrocracking the petroleum heavy oil by the hydrocracking means to acquire a disintegrated iron-based catalyst; and
   a resupplying means resupplying the disintegrated iron-based catalyst to the hydrocracking means.

9. The hydrocracking device according to claim 8, wherein the disintegrating means is a pulverizing machine.

10. The hydrocracking device according to claim 8, further comprising a screening means for screening the disintegrated iron-based catalyst before resupply to the hydrocracking means to make the maximum particle diameter thereof equal to or less than 30 μm.

11. The method for hydrocracking according to claim 3, wherein a supply amount of the heavy reaction product contained in the processed residual oil component relative to the petroleum heavy oil in the raw material slurry is from 10% by mass to 80% by mass.

12. The method for hydrocracking according to claim 4, wherein a supply amount of the heavy reaction product contained in the processed residual oil component relative to the petroleum heavy oil in the raw material slurry is from 10% by mass to 80% by mass.

13. The method for hydrocracking according to claim 3, wherein a supply amount of the disintegrated iron-based catalyst relative to the petroleum heavy oil in the raw material slurry is from 1% by mass to 10% by mass.

14. The method for hydrocracking according to claim 4, wherein a supply amount of the disintegrated iron-based catalyst relative to the petroleum heavy oil in the raw material slurry is from 1% by mass to 10% by mass.

* * * * *